US008935065B2

(12) United States Patent
Fushimi et al.

(10) Patent No.: US 8,935,065 B2
(45) Date of Patent: Jan. 13, 2015

(54) CONTROL DEVICE AND CONTROL METHOD FOR AUTOMATIC TRANSMISSION

(71) Applicant: Aisin Aw Co., Ltd., Anjo (JP)

(72) Inventors: Shoji Fushimi, Ichinomiya (JP);
Yasuhito Suzuki, Hekinan (JP);
Tsunekazu Inakura, Anjo (JP);
Masatoshi Taguchi, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 14/238,001

(22) PCT Filed: Nov. 16, 2012

(86) PCT No.: PCT/JP2012/079786
§ 371 (c)(1),
(2) Date: Feb. 10, 2014

(87) PCT Pub. No.: WO2013/073668
PCT Pub. Date: May 23, 2013

(65) Prior Publication Data
US 2014/0172255 A1 Jun. 19, 2014

(30) Foreign Application Priority Data

Nov. 16, 2011 (JP) ................................. 2011-251114

(51) Int. Cl.
B60W 10/06 (2006.01)
B60W 10/10 (2012.01)
F16H 61/68 (2006.01)
F16H 61/18 (2006.01)
F16H 63/50 (2006.01)
F16H 61/686 (2006.01)

(52) U.S. Cl.
CPC ................ F16H 61/68 (2013.01); F16H 61/18 (2013.01); F16H 63/50 (2013.01); F16H 61/686 (2013.01)
USPC ........................................... 701/58; 477/110

(58) Field of Classification Search
USPC ............................................ 701/58; 477/110
See application file for complete search history.

(56) References Cited

U.S. PATENT DOCUMENTS

| 6,379,283 | B1* | 4/2002 | Cullen ........................... 477/110 |
| 7,011,604 | B2* | 3/2006 | Watanabe et al. .............. 477/110 |
| 2010/0191428 | A1* | 7/2010 | Tamura et al. .................. 701/58 |
| 2011/0295474 | A1* | 12/2011 | Ma et al. .......................... 701/58 |

FOREIGN PATENT DOCUMENTS

| JP | A-2004-245395 | 9/2004 |
| JP | A-2007-253704 | 10/2007 |
| JP | A-2009-281509 | 12/2009 |

OTHER PUBLICATIONS

International Search Report issued in International Application No. PCT/JP2012/079786 mailed Dec. 18, 2012.

* cited by examiner

Primary Examiner — Edwin A Young
(74) Attorney, Agent, or Firm — Oliff PLC

(57) ABSTRACT

A control device for an automatic transmission. The control device configured to determine if the automatic transmission is in such a condition that the automatic transmission accelerates the vehicle at predetermined acceleration when the output command value is transmitted to the control device for the motor. The output command value is not cancelled if it is determined by the determining means that the automatic transmission is not in such a condition that the automatic transmission accelerates the vehicle at the predetermined acceleration, and the output command value is cancelled if it is determined by the determining means that the automatic transmission is in such a condition that the automatic transmission accelerates the vehicle at the predetermined acceleration.

7 Claims, 5 Drawing Sheets

FIG. 3

|  |  | C-1 | C-2 | C-3 | B-1 | B-2 | F-1 |
|---|---|---|---|---|---|---|---|
|  | P |  |  |  |  |  |  |
|  | REV |  |  | ○ |  | ○ |  |
|  | N |  |  |  |  |  |  |
| D | 1st | ○ |  |  |  | ● | ○ |
| D | 2nd | ○ |  |  | ○ |  |  |
| D | 3rd | ○ |  | ○ |  |  |  |
| D | 4th | ○ | ○ |  |  |  |  |
| D | 5th |  | ○ | ○ |  |  |  |
| D | 6th |  | ○ |  | ○ |  |  |

※ ○: ENGAGED  ●: ENGAGED WHEN ENGINE BRAKE IS IN OPERATION

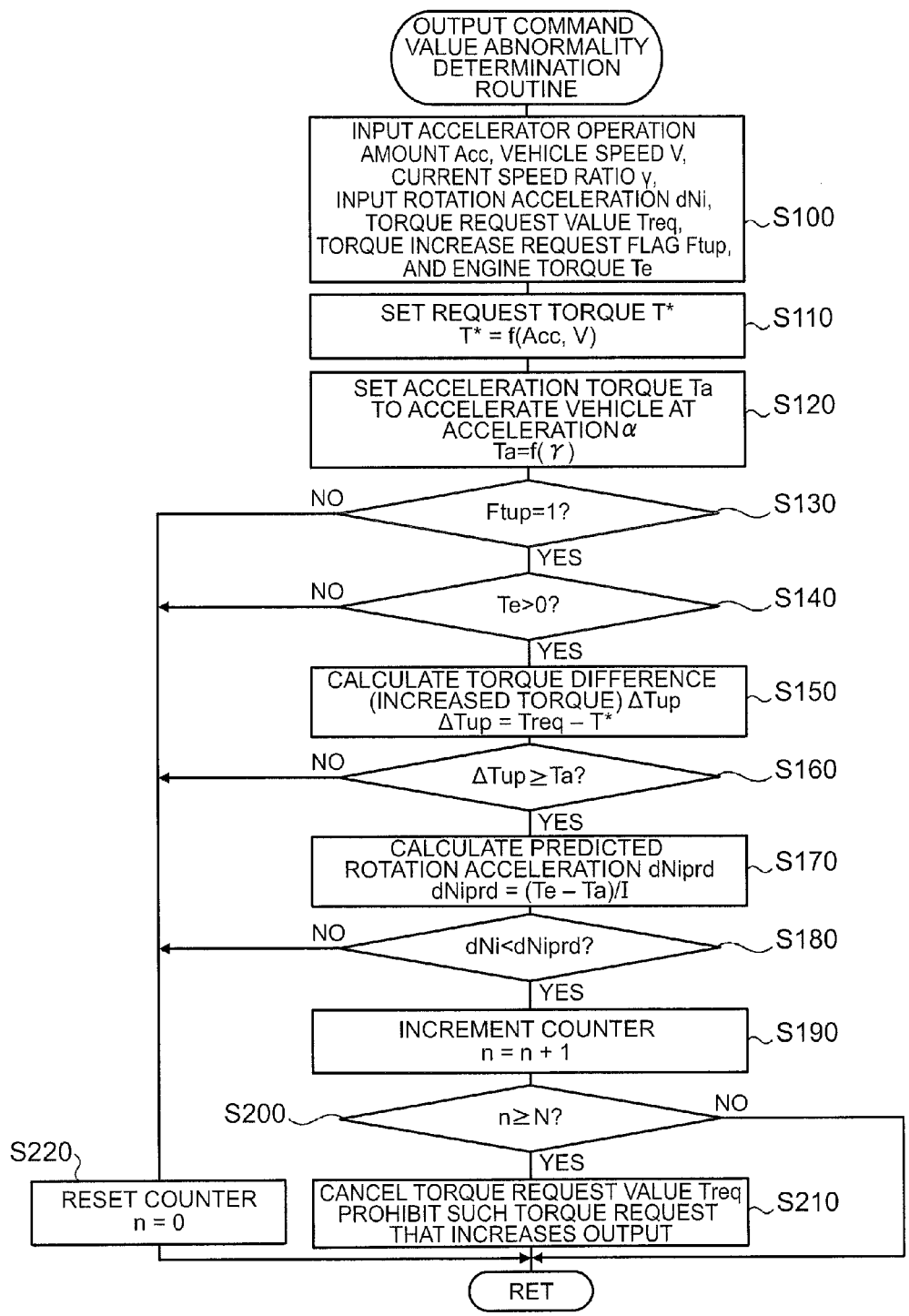

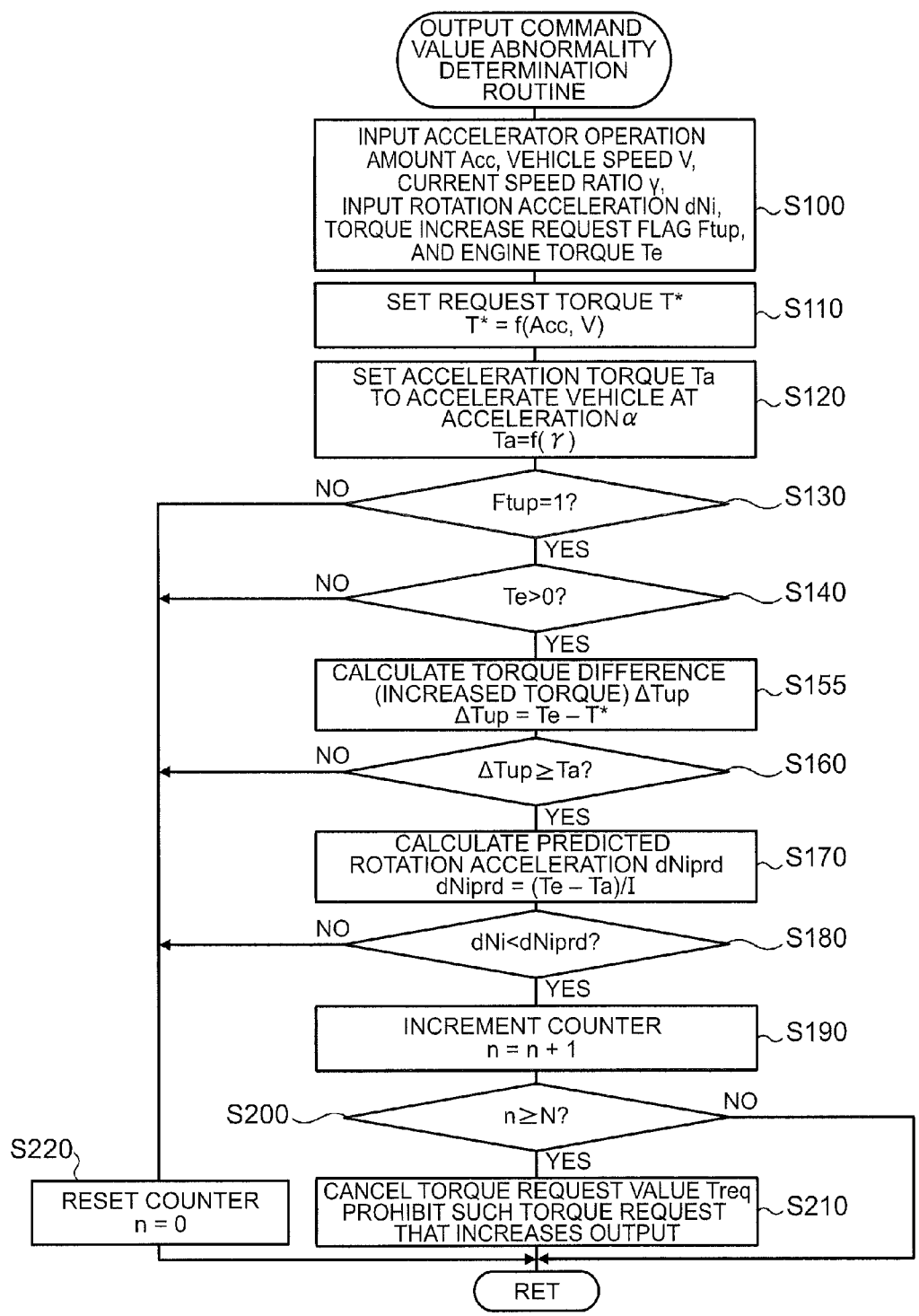

CONTROL DEVICE AND CONTROL METHOD FOR AUTOMATIC TRANSMISSION

TECHNICAL FIELD

The present invention relates to a control device and a control method for an automatic transmission that is mounted on a vehicle and that is capable of transmitting power applied from a motor to an input member to an output member while changing the speed ratio.

BACKGROUND ART

Conventionally, a control device that calculates, during a shift operation, failure determination torque at a transmission input shaft by multiplying the sum of traveling torque required to retain a current traveling speed and a torque constant that causes a vehicle to obviously accelerate by a speed ratio and a final reduction ratio is known as this type of control device for an automatic transmission (see, e.g., Patent Document 1). This control device transmits a torque request value to an engine control device via a communication path. If the torque request value continues to be equal to or larger than the failure determination torque for a predetermined time, the control device determines that the torque request value is abnormal, and disengages a starting clutch so as not to make the driver of the vehicle feel sudden acceleration.

[Related Art Document]
[Patent Document]
[Patent Document 1] Japanese Patent Application Publication No. 2009-281509 (JP 2009-281509 A)

SUMMARY OF THE INVENTION

However, depending on the vehicle or the automatic transmission, a torque request value larger than the torque that causes a vehicle to obviously accelerate as described above may be transmitted to the engine side even if the torque request value is not abnormal. In this case, whether the torque request value is abnormal or not may not be able to be correctly determined by merely comparing the torque request value with the failure determination torque at the transmission input shaft like the conventional control device for the automatic transmission.

It is a primary object of a control device and a control method for an automatic transmission according to the present invention to accurately determine if an output command value to a motor is abnormal or not to suppress vehicle acceleration that is not intended by the driver.

The control device and the control method for the automatic transmission according to the present invention use the following means in order to achieve the above primary object.

A control device for an automatic transmission according to the present invention is a control device for an automatic transmission which controls the automatic transmission mounted on a vehicle and capable of changing the speed of power from a motor to output the changed power, and which sets an output command value for the motor so as to increase output of the motor and transmits the output command value to a control device for the motor when predetermined output increase request conditions are satisfied, characterized by including: determining means for determining if the automatic transmission is in such a condition that the automatic transmission accelerates the vehicle at predetermined acceleration, when the output command value is transmitted to the control device for the motor, wherein the output command value is not cancelled if it is determined by the determining means that the automatic transmission is not in such a condition that the automatic transmission accelerates the vehicle at the predetermined acceleration, and the output command value is cancelled if it is determined by the determining means that the automatic transmission is in such a condition that the automatic transmission accelerates the vehicle at the predetermined acceleration.

The control device for the automatic transmission sets the output command value for the motor so as to increase the output of the motor and transmits the output command value to the control device for the motor when the predetermined output increase request conditions are satisfied. When the output command value is transmitted to the control device for the motor, the control device for the automatic transmission does not cancel the output command value if it is determined that the automatic transmission is not in such a condition that the automatic transmission accelerates the vehicle at the predetermined acceleration, and cancels the output command value if it is determined that the automatic transmission is in such a condition that the automatic transmission accelerates the vehicle at the predetermined acceleration. When the output command value is transmitted to the control device for the motor, the control device for the automatic transmission determines if the automatic transmission is in such a condition that the automatic transmission accelerates the vehicle at the predetermined acceleration, and cancels the output command value if it is determined that the automatic transmission is in such a condition that the automatic transmission accelerates the vehicle at the predetermined acceleration. Accordingly, whether the output command value for the motor is abnormal or not can be more accurately determined, and acceleration of the vehicle which is not intended by the driver can be suppressed. The automatic transmission to which this control device is applied may be either a stepped automatic transmission or a continuously variable transmission.

The determining means may include torque determining means for determining if increased torque of the motor according to the output command value is equal to or larger than acceleration torque required to accelerate the vehicle at the predetermined acceleration, and acceleration determining means for determining if the automatic transmission is in such a condition that the automatic transmission accelerates the vehicle at the predetermined acceleration. The output command value may not be cancelled if it is determined by the torque determining means that the increased torque is less than the acceleration torque or if it is determined by the acceleration determining means that the automatic transmission is not in such a condition that the automatic transmission accelerates the vehicle at the predetermined acceleration, and the output command value may be cancelled if it is determined by the torque determining means that the increased torque is equal to or larger than the acceleration torque or if it is determined by the acceleration determining means that the automatic transmission is in such a condition that the automatic transmission accelerates the vehicle at the predetermined acceleration.

This control device determines if the increased torque for the motor according to the output command value is equal to or larger than the acceleration torque required to accelerate the vehicle at the predetermined acceleration. If the increased torque for the motor according to the output command value is equal to or larger than the acceleration torque, there is a possibility that the vehicle may be accelerated at the predetermined acceleration without driver's intent. Depending on the vehicle or the automatic transmission, when, e.g., a manual shift down request is made, the output command value is sometimes set to a large value so as to increase output of the motor in order that traveling performance and drivability of the vehicle are improved, on the assumption that the vehicle is not accelerated at the predetermined acceleration. Accordingly, whether the output command value is abnormal or not may not be able to be accurately determined by merely comparing the increased torque with the acceleration torque. This control device therefore further determines if the automatic transmission is in such a condition that the automatic transmission accelerates the vehicle at the predetermined acceleration, and cancels the output command value set by output command value setting means if it is determined that the increased torque is equal to or larger than the acceleration torque and that the automatic transmission is in such a condition that the automatic transmission accelerates the vehicle at the predetermined acceleration. This allows the control device for the automatic transmission to more accurately determine if the output command value for the motor is abnormal, and to suppress vehicle acceleration that is not intended by the driver. The automatic transmission to which this control device is applied may be either a stepped automatic transmission or a continuously variable transmission.

The acceleration determining means may determine that the automatic transmission is in such a condition that the automatic transmission accelerates the vehicle at the predetermined acceleration, if actual rotation acceleration of an input member of the automatic transmission is less than predicted rotation acceleration of the input member according to the output command value. That is, if the actual rotation acceleration of the input member is less than the predicted rotation acceleration, the torque from the motor according to the output command value is not used to increase the rotational speed of the input member, but is transferred from the input member to an output member. It can therefore be considered that the torque from the motor according to the output command value is used to accelerate the vehicle at the predetermined acceleration or higher. Accordingly, if the torque from the motor according to the output command value minus driver request torque requested for the motor by the driver is equal to or larger than the acceleration torque and the actual rotation acceleration of the input member is less than the predicted rotation acceleration, it can be determined that setting of the output command value for the motor is abnormal. Cancelling the output command value in such a case can suppress input of excessive torque to the input member. As a result, regardless of whether the automatic transmission is performing a shift operation or not, whether the output command value for the motor is abnormal or not can be more accurately determined, and vehicle acceleration that is not intended by the driver can be suppressed.

The acceleration determining means may calculate the predicted rotation acceleration of the input member based on torque being output from the motor minus the acceleration torque. The predicted rotation acceleration of the input member can thus be more properly calculated.

The output command value may be a torque request value representing torque to be output by the motor, and the torque determining means may set as the increased torque the torque request value minus driver request torque that is requested for the motor by the driver. Transmitting the torque request value from an automatic transmission side to a motor side as necessary in this manner can improve traveling performance and drivability of the vehicle. In this case, whether there is a possibility that the vehicle may be accelerated at the predetermined acceleration without driver's intent can be more properly determined by comparing the torque request value minus the driver request torque with the acceleration torque.

The torque request value may be larger than the acceleration torque when a manual shift-down request is made for the automatic transmission. This can rapidly increase the rotational speed of the motor or the input member when the manual shift-down request is made by the driver, thereby drivability can be improved.

A control method for an automatic transmission according to the present invention is a control method for an automatic transmission, in which the automatic transmission mounted on a vehicle and capable of changing the speed of power from a motor to output the changed power is controlled, and an output command value for the motor is set so as to increase output of the motor when predetermined output increase request conditions are satisfied, and is transmitted to a control device for the motor, including the steps of: (a) determining if the automatic transmission is in such a condition that the automatic transmission accelerates the vehicle at predetermined acceleration, when the output command value is transmitted to the control device for the motor; and (b) not cancelling the output command value if it is determined in the step (a) that the automatic transmission is not in such a condition that the automatic transmission accelerates the vehicle at the predetermined acceleration, and cancelling the output command value if it is determined in the step (a) that the automatic transmission is in such a condition that the automatic transmission accelerates the vehicle at the predetermined acceleration.

According to this method, whether the output command value to the motor is abnormal or not can be accurately determined to suppress vehicle acceleration that is not intended by the driver.

BRIEF DESCRIPTION OF THE DRAWINGS

FIG. 3 is an operation table showing the relation between each shift speed and the operation state of clutches and brakes of the automatic transmission 25.

FIG. 4 is a flowchart showing an example of an output command value abnormality determination routine.

FIG. 5 is a flowchart showing an output command value abnormality determination routine according to a modification.

MODES FOR CARRYING OUT THE INVENTION

A mode for carrying out the present invention will be described based on an embodiment.

Figure 1:
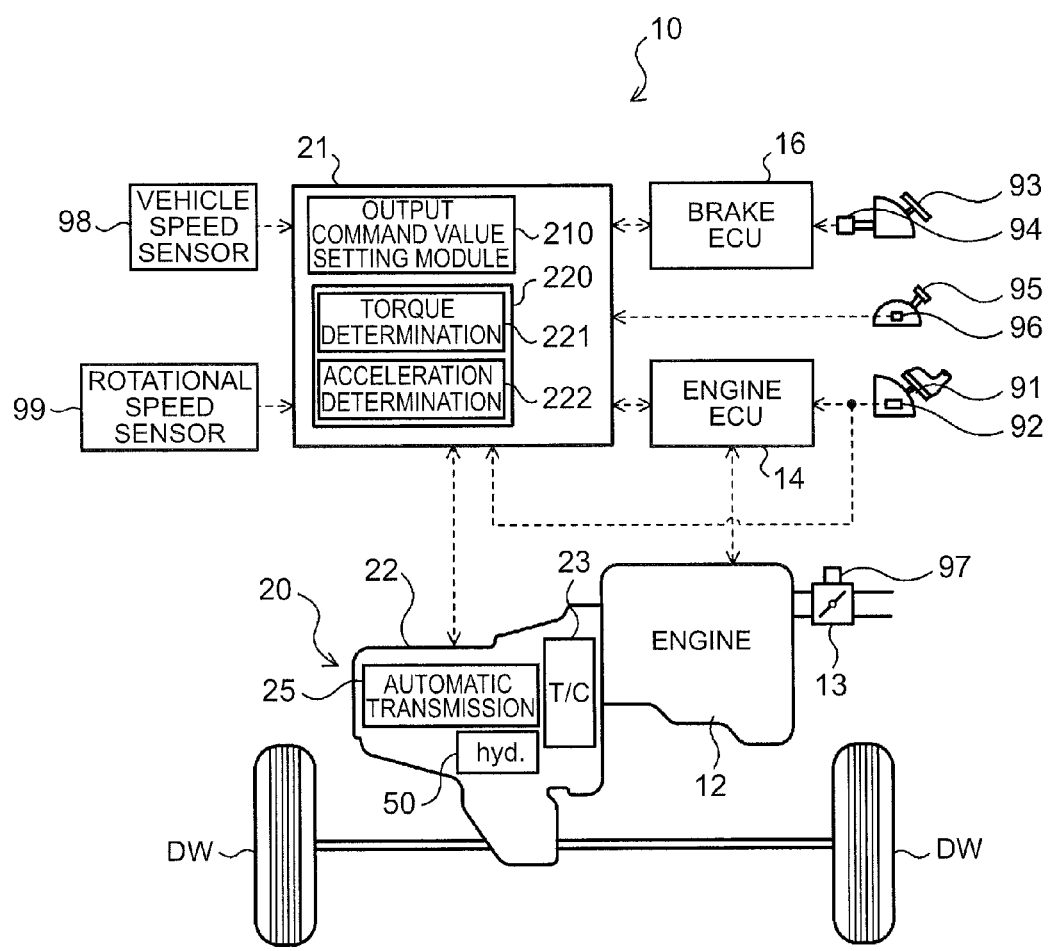
FIG. 1 is a schematic configuration diagram of an automobile 10 as a vehicle having mounted thereon an automatic transmission 25 that is controlled by a shift ECU 21 as a control device for an automatic transmission according to the present invention.

FIG. 1 is a schematic configuration diagram of an automobile 10 as a vehicle including a control device for an automatic transmission according to the present invention. The automobile 10 shown in the figure includes: an engine 12 as a power source, namely an internal combustion engine that outputs power by explosive combustion of a mixture of air and hydrocarbon-based fuel such as gasoline or light oil; an engine electronic control unit (hereinafter referred to as the "engine ECU") 14 that controls the engine 12; a brake electronic control unit (hereinafter referred to as the "brake ECU") 16 that controls an electronically controlled hydraulic brake unit, not shown; a power transmission device 20 that is connected to a crankshaft of the engine 12 and transmits power from the engine 12 to right and left drive wheels DW, etc. The power transmission device 20 has a torque converter 23, a stepped automatic transmission 25, a hydraulic control device 50, and a shift electronic control unit (hereinafter referred to as the "shift ECU") 21 that controls these components.

The engine ECU 14 is configured as a microcomputer having a CPU, not shown, as a core. As shown in FIG. 1, the engine ECU 14 receives an accelerator operation amount Acc from an accelerator pedal position sensor 92 that detects the amount by which an accelerator pedal 91 is stepped on (the amount by which the accelerator pedal 91 is operated), a vehicle speed V from a vehicle speed sensor 98, signals from various sensors etc. such as a crankshaft position sensor, not shown, that detects the rotation position of the crankshaft, signals from the brake ECU 16 and the shift ECU 21, etc. Based on these signals, the engine ECU 14 controls an electronically controlled throttle valve 13, a fuel ignition valve and an ignition plug, which are not shown, etc.

The brake ECU 16 is also configured as a microcomputer having a CPU, not shown, as a core. As shown in FIG. 1, the brake ECU 16 receives a master cylinder pressure that is detected by a master cylinder pressure sensor 94 when a brake pedal 93 is stepped on, the vehicle speed V from the vehicle speed sensor 98, signals from various sensors, not shown, etc., signals from the engine ECU 14 and the shift ECU 21, etc. The brake ECU 16 controls a brake actuator (hydraulic actuator), not shown, based on these signals.

Figure 2:
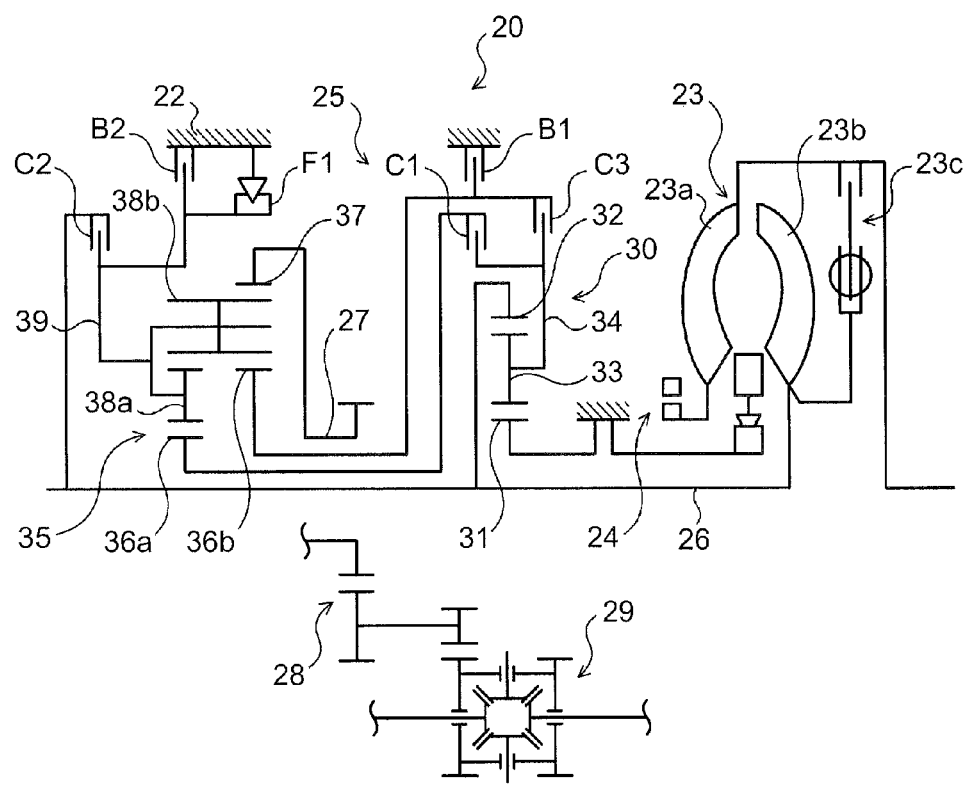
FIG. 2 is a schematic configuration diagram of a power transmission device 20 including the automatic transmission 25.

As shown in FIG. 2, the power transmission device 20 includes the torque converter 23, an oil pump 24, the automatic transmission 25, a differential mechanism (differential gear) 29, the hydraulic control device 50, etc., which are accommodated in a transmission case 22. The torque converter 23 includes an input-side pump impeller 23a that is connected to the crankshaft of the engine 12, an output-side turbine runner 23b connected to an input shaft (input member) 26 of the automatic transmission 25, and a lockup clutch 23c. The oil pump 24 is configured as a gear pump including a pump assembly formed by a pump body and a pump cover, and an external gear connected to the pump impeller 23a of the torque converter 23 via a hub. As the external gear is rotated by power from the engine 12, hydraulic oil (ATF) stored in an oil pan (not shown) is sucked by the oil pump 24 and pumped to the hydraulic control device 50. The hydraulic control device 50 generates an oil pressure that is required by the torque converter 23 or the automatic transmission 25, and supplies hydraulic oil to a portion to be lubricated such as various bearings.

The automatic transmission 25 is configured as a six-speed transmission, and as shown in FIG. 2, includes a single-pinion type planetary gear mechanism 30, a Ravigneaux type planetary gear mechanism 35, three clutches C1, C2, and C3 that change a power transmission path from the input side to the output side, two brakes B1 and B2, and a one-way clutch F1. The single-pinion type planetary gear mechanism 30 has a sun gear 31 as an external gear fixed to the transmission case 22, a ring gear 32 as an internal gear disposed concentrically with the sun gear 31 and connected to the input shaft 26, a plurality of pinion gears 33 meshing with the sun gear 31 and meshing with the ring gear 32, and a carrier 34 rotatably and revolvably holding the plurality of pinion gears 33. The Ravigneaux type planetary gear mechanism 35 has two sun gears 36a, 36b as external gears, a ring gear 37 as an internal gear fixed to an output shaft (output member) 27 of the automatic transmission 25, a plurality of short pinion gears 38a meshing with the sun gear 36a, a plurality of long pinion gears 38b meshing with the sung ear 36b and the plurality of short pinion gears 38a and meshing with the ring gear 37, and a carrier 39 rotatably and revolvably holding the plurality of short pinion gears 38a and the plurality of long pinion gears 38b which are coupled to each other, and being supported by the transmission case 22 via the one-way clutch F1. The output shaft 27 of the automatic transmission 25 is connected to the drive wheels DW via a gear mechanism 28 and the differential mechanism 29.

The clutch C1 is a hydraulic clutch capable of fastening the carrier 34 of the single-pinion type planetary gear mechanism 30 and the sun gear 36a of the Ravigneaux type planetary gear mechanism 35 and unfastening the carrier 34 from the sun gear 36a. The clutch C2 is a hydraulic clutch capable of fastening the input shaft 26 and the carrier 39 of the Ravigneaux type planetary gear mechanism 35 and unfastening the input shaft 26 from the carrier 39. The clutch C3 is a hydraulic clutch capable of fastening the carrier 34 of the single-pinion type planetary gear mechanism 30 and the sun gear 36b of the Ravigneaux type planetary gear mechanism 35 and unfastening the carrier 34 from the sun gear 36b. The brake B1 is a hydraulic brake capable of fixing the sun gear 36b of the Ravigneaux type planetary gear mechanism 35 to the transmission case 22 and unfixing the sun gear 36b from the transmission case 22. The brake B2 is a hydraulic brake capable of fixing the carrier 39 of the Ravigneaux type planetary gear mechanism 35 to the transmission case 22 and unfixing the carrier 39 from the transmission case 22. The clutches C1 to C3 and the brakes B1 and B2 operate in response to supply/discharge of the hydraulic oil by the hydraulic control device 50. FIG. 3 shows an operation table representing the relation between each shift speed and the operation state of the clutches C1 to C3 and the brakes B1 and B2 of the automatic transmission 25. The automatic transmission 25 provides first to sixth forward speeds and one reverse speed by bringing the clutches C1 to C3 and the brakes B1 and B2 to the states shown in the operation table of FIG. 3.

The shift ECU 21 of the power transmission device 20 is configured as a microcomputer having a CPU, not shown, as a core, and includes, in addition to the CPU, a ROM that stores various programs, a RAM that temporarily stores data, an input/output port and a communication port (both not shown), etc. As shown in FIG. 1, the shift ECU 21 receives the accelerator operation amount Acc from the accelerator pedal position sensor 92, the vehicle speed V from the vehicle speed sensor 98, a shift range SR from a shift range sensor 96 detecting the operation position of a shift lever 95 that selects a desired one of a plurality of shift ranges, an input rotational speed (rotational speed of the turbine runner 23b or the input shaft 26) Ni of the automatic transmission 25 from a rotational speed senor 99, signals from other sensors, not shown, etc., signals from the engine ECU 14 and the shift ECU 21, etc. The shift ECU 21 controls the torque converter 23 and the automatic transmission 25, and the hydraulic control device 50, based on these signals.

As those shift ranges that can be selected via the shift lever 95, a sport range (S-range) that allows the driver to select any shift speed is prepared in addition to a parking range (P-range) that is selected for parking, a reverse range (R-range) for reverse traveling, a neutral range (N-range) for a neutral condition, a drive range (D-range) for normal forward traveling. Once set to the S-range, the shift lever 95 can be set to a shift-up command position or a shift-down command position. Setting the shift lever 95 to the shift-up command position allows the shift speed to be changed one by one to the shift-up side. Setting the shift lever 95 to the shift-down command position allows the shift speed to be changed one by one to the shift-down side. Moreover, in the automobile 10 of the embodiment, a shift-up command switch and a shift-down command switch are disposed near a steering wheel, and any one of the plurality of shift speeds can also be selected by operating these switches.

In the shift ECU 21, hardware such as the CPU, the ROM, and the RAM operates with software such as a control program installed in the ROM to construct an output command value setting module (output command value setting means) 210 as a function block. If predetermined output increase request conditions or output limitation request conditions, or rotational speed request conditions are satisfied, the output command value setting module 210 sets an output command value such as a torque request value Treq indicating torque to be output by the engine 12 or a target rotational speed Ne* of the engine 12, and transmits the set output command value to the engine ECU 14. In response to the output command value, the engine ECU 14 controls the engine 12 so as to achieve the torque or the rotational speed according to the output command value.

In the embodiment, the output increase request conditions are satisfied, e.g., when a shift-down request of the automatic transmission 25 is made (normal shift-down), when a manual shift-down request is made by selection of the shift-down command position by the driver etc., or when a lockup request of the lockup clutch 23c is made. When the output increase request conditions are satisfied, the output command value setting module 210 sets a torque increase request flag Ftup to value "1," and sets as the torque request value Treq for the engine 12 a value determined so that the rotational speed of the engine 12 (input shaft 26) which is required upon completion of the shift-down or lockup can be quickly achieved. The torque request value Treq is predetermined for each of the normal shift-down request, the manual shift-down request, and the lockup request on the assumption that the automobile 10 is not accelerated at predetermined acceleration α as acceleration that makes the driver or occupant of the automobile 10 feel obvious acceleration shock, and the predetermined torque request values Treq are stored in the ROM of the shift ECU 21 etc. The output command value setting module 210 reads a value according to the request from the ROM etc., sets the read value as the torque request value Treq, and transmits it to the engine ECU 14.

Regarding the manual shift-down request, a plurality of values according to shift-down patterns are predetermined as the torque request values Treq, and a value corresponding to a predetermined shift-down pattern is the maximum value of all the torque request values Treq. Moreover, in the embodiment, the maximum value of the torque request values Treq is larger than acceleration torque Ta that is required for the engine 12 in order that the automobile 10 is accelerated at the predetermined acceleration α in the state where the speed ratio set by the automatic transmission 25 is a predetermined speed ratio (e.g., a speed ratio corresponding to the first to third speeds). Thus, the rotational speed of the engine 12 and the input shaft 26 can be quickly increased when a manual shift-down request is made by the driver, thereby drivability can be improved. In the embodiment, when the output increase request conditions are not satisfied, the torque increase request flag Ftup is set to value "0," and the torque request value Treq is set to value "0."

The output limitation request conditions are satisfied, e.g., when the accelerator pedal 91 and the brake pedal 93 are simultaneously stepped on, when the oil temperature in the hydraulic control device 50 reaches a predetermined temperature or higher. When the output limitation request conditions are satisfied, the output command value setting module 210 sets a relatively small value as the torque request value Treq, which is predetermined in view of protecting the automatic transmission 25, and transmits the set torque request value Treq to the engine ECU 14. The rotational speed request conditions are satisfied, e.g., when a shift-up request of the automatic transmission 25 is made (normal shift-up), or when a manual shift-up request is made by selection of the shift-up command position by the driver. When the rotational speed request conditions are satisfied, the output command value setting module 210 sets as the target rotational speed Ne* of the engine 12 the rotational speed of the engine 12 (input shaft 26) which is required upon completion of the shift-up, and transmits the set target rotational speed Ne* to the engine ECU 14.

Moreover, in the shift ECU 21, the hardware such as the CPU, the ROM, and the RAM operates with the software such as the control program installed in the ROM to construct as a function block an abnormality determination module 220 including a torque determination module 221 and an acceleration determination module 222 that are used to determine if the output command value that is set by the output command value setting module 210 is abnormal.

Next, procedures for determining if setting of the output command value is abnormal or not by the abnormality determination module 220 will be described with reference to FIG. 4. FIG. 4 is a flowchart showing an example of an output command value abnormality determination routine that is executed every predetermined time (e.g., every 10 msec) by the abnormality determination module 220 of the shift ECU 21 in order to determine if the torque request value Treq that is set by the output command value setting module 210 when the output increase request conditions are satisfied is abnormal.

When the output command value abnormality determination routine of FIG. 4 is started, the abnormality determination module 220 executes an input process of data required to determine abnormality, such as the accelerator operation amount Acc from the accelerator pedal position sensor 92, the vehicle speed V from the vehicle speed sensor 98, a current speed ratio γ of the automatic transmission 25, an input rotation acceleration (actual rotation acceleration of the input shaft 26) dNi of the automatic transmission 25, a torque request value Treq, a value of the torque increase request flag Ftub, and engine torque Te from the engine ECU 14 (step S100). The current speed ratio γ of the automatic transmission 25 is set according to the accelerator operation amount Acc or an opening THR of the throttle valve 13 and the vehicle speed V (during a shift operation, the speed ratio before completion of the shift operation) by using a shift line, not shown, and is stored in a predetermined storage region of the shift ECU 21. The input rotation acceleration dNi of the automatic transmission 25 is separately calculated by the shift ECU 21 based on the input rotational speed Ni from the rotational speed sensor 99, and is stored in a predetermined storage region. The torque request value Treq and the torque increase request flag Ftup are set as described above by the output command value setting module 210. By using a predetermined map or calculation formula, the engine torque Te is calculated by the engine ECU 14 as an estimate of torque that is actually output from the engine 12, based on the rotational speed Ne of the engine 12 which is calculated from a signal from the crankshaft position sensor, not shown, the intake air amount of the engine 12 which is detected by an airflow meter, not shown, or the opening THR of the throttle valve 13. The engine torque Te is input from the engine ECU 14 via communication.

After the data input process in step S100, the torque determination module 221 of the abnormality determination module 220 derives from a request torque setting map, not shown, a value corresponding the accelerator opening amount Acc and the vehicle speed V input in step S100, and sets the derived value as request torque T* requested for the engine 12 by the driver (step S110). In step S110, the request torque T* may be set based on the throttle opening THR from a throttle opening sensor 97 that detects the opening of the throttle valve 13. Instead of setting the request torque T* in step S110, request torque T* set by the engine ECU 14 may be input via communication in step S100.

Moreover, the torque determination module 221 sets the acceleration torque Ta that is required for the engine 12 to accelerate the automobile 10 at the predetermined acceleration α based on the current speed ratio γ input in step S100 (step S120). The predetermined acceleration α is calculated in advance for each of the speed ratios corresponding to the shift speeds, and stored in the ROM of the shift ECU 21 etc. In step S120, the torque determination module 221 derives a value corresponding to the current speed ratio γ from the ROM etc. and sets the derived value as the acceleration torque Ta. The acceleration torque Ta can be calculated according to the following Formula (1). In step S120, the acceleration torque Ta may be calculated according to Formula (1) in view of the number of occupants.

$$Ta = \alpha(m/s^2) \cdot \text{vehicle weight (kg)} \cdot \text{tire diameter (m)} / (\text{differential ratio} \cdot \text{counter ratio} \cdot \gamma) \quad (1)$$

The torque determination module 221 then determines if the torque increase request flag Ftup input in step S100 has value "1" (step S130). If the torque increase request flag Ftup has value "0," the torque determination module 221 resets a counter, not shown, (step S220), and terminates the routine. On the other hand, if the torque increase request Ftup has value "1" and the torque request value Treq has been set by the output command value setting module 210 upon satisfaction of the output increase request conditions, the torque determination module 221 determines if the engine torque Te input in step S100 is larger than value "0" (step S140). If the engine torque Te is not larger than value "0" (has value "0"), the torque determination module 221 resets the counter, not shown (step S220) and terminates the routine.

If it is determined in step 140 that the engine torque Te is larger than value "0," the torque determination module 221 calculates a torque difference ΔTup as increased torque of the engine 12 by subtracting the request torque T* set in step S110 from the torque request value Treq input in step S100 (step S150). The torque determination module 221 then determines if the calculated torque difference ΔTup is equal to or larger than the acceleration torque Ta set in step S120 (step S160). If the torque difference ΔTup is less than the acceleration torque Ta, the torque determination module 221 determines that there is no possibility that the automobile 10 may be accelerated at the predetermined acceleration α, and determines that the torque request value Treq is not abnormal. The torque determination module 221 thus resets the counter (step S220) and terminates the routine.

If the torque difference ΔTup is equal to or larger than the acceleration torque Ta, there is a possibility that the automobile 10 may be accelerated at the predetermined acceleration α without driver's intent. In the automobile 10 of the embodiment, however, when the output increase request conditions are satisfied, the torque request value Treq is sometimes set to a large value so as to increase output of the engine 12 in order to improve traveling performance and drivability, on the assumption that the automobile 10 is not accelerated at the predetermined acceleration α. That is, in the case where the manual shift-down request from the driver corresponds to the predetermined shift-down pattern, the torque request value Treq is larger than the acceleration torque Ta. Accordingly, in this case, whether the torque request value Treq for the engine 12 is abnormal or not may not be able to be accurately determined by merely comparing the torque difference ΔTup with the acceleration torque Ta.

Thus, if it is determined in step S160 that the torque difference ΔTup is equal to or larger than the acceleration torque Ta, the acceleration determination module 222 of the abnormality determination module 220 calculates predicted rotation acceleration dNiprd of the input shaft 26 of the automatic transmission 25 by dividing a value obtained by subtracting the acceleration torque Ta from the engine torque Te input in step S100 by inertia I from a rotating element of the engine 12 to a position before the ring gear 37 as an internal gear fixed to the output shaft (output member) 27 of the automatic transmission 25 (step S170). Thus, the predicted rotation acceleration dNiprd as acceleration of the input shaft 26 in the case where it is assumed that the automobile 10 is being accelerated at the predetermined acceleration α by the torque from the engine 12 corresponding to the torque request value Treq can be more properly calculated. The acceleration determination module 222 determines if the input rotation acceleration dNi input in step S100 is less than the predicted rotation acceleration dNiprd, namely if the automatic transmission 25 is in such a condition that the automatic transmission 25 accelerates the automobile 10 at the predetermined acceleration α (step S180).

If the input rotation acceleration dNi is equal to or higher than the predicted rotation acceleration dNiprd, the acceleration determination module 222 resets the counter (step S220) and terminates the routine. That is, if it is determined in step S180 that the input rotation acceleration dNi is equal to or higher than the predicted rotation acceleration dNiprd, the torque from the engine 12 according to the torque request value Treq is being used to increase the rotational speed of the input shaft 26 (to cause revving up), because the actual rotation acceleration of the input shaft 26 is high. Accordingly, in this case, the automatic transmission 25 is not in such a condition that the automatic transmission 25 accelerates the automobile 10 at the predetermined acceleration α, and no excessive torque is being transferred from the engine 12 to the output shaft 27 (drive wheels DW) side via the automatic transmission 25 (input shaft 26). It can therefore be considered that the torque request value Treq is not abnormal.

On the other hand, if the input rotation acceleration dNi is less than the predicted rotation acceleration dNiprd, the acceleration determination module 222 increments the counter (step S190), and determines if a count value "n" of the counter is equal to or larger than a predetermined threshold N (e.g., value "50") (step S200). If the count value "n" is less than the threshold N, the acceleration determination module 222 terminates the routine. If it is determined in step S200 that the count value "n" is equal to or larger than the threshold N, the abnormality determination module 220 informs the engine ECU 14 that the torque request value Treq should be cancelled, and turns on a predetermined flag to prohibit the output command value setting module 210 from setting the torque request value Treq upon satisfaction of the output increase request conditions (step S210).

That is, in the case where the input rotation acceleration dNi (actual rotation acceleration of the input shaft 26) is less than the predicted rotation acceleration dNiprd, the torque from the engine 12 according to the torque request value Treq is not being used to increase the rotational speed of the input shaft 26. Accordingly, in this case, the automatic transmission 25 is in such a condition that the automatic transmission 25 accelerates the automobile 10 at the predetermined acceleration α, and the torque from the engine 12 is being transferred from the input shaft 26 to the output shaft 27 of the automatic transmission 25 and used to accelerate the automobile 10 at the predetermined acceleration α or higher. It can therefore be considered that the torque request value Treq is abnormal. If the input rotation acceleration dNi continues to be less than the predicted rotation acceleration dNiprd for a time corresponding to the threshold N, it can be determined that setting of the torque request value Treq for the engine 12 is abnormal. In this case, if the torque request value Treq is cancelled and subsequent setting of the torque request value Treq is prohibited, subsequent input of excessive torque to the input shaft 26 can be suppressed.

As described above, when the predetermined output increase request conditions are satisfied, the shift ECU 21 as a control device for the automatic transmission 25 sets a torque request value Treq for the engine 12 so as to increase output of the engine 12, and transmits the torque request value Treq to the engine ECU 14. When the torque request value Treq is transmitted to the engine ECU 14, the shift ECU 21 does not cancel the torque request value Treq if it is determined that the automatic transmission 25 is not in such a condition that the automatic transmission 25 accelerates the automobile 10 at the predetermined acceleration α, but cancels the torque request value Treq if it is determined that the automatic transmission 25 is in such a condition that the automatic transmission 25 accelerates the automobile 10 at the predetermined acceleration α. Thus, when the torque request value Treq is transmitted to the engine ECU 14, the shift ECU 21 determines if the automatic transmission 25 is in such a condition that the automatic transmission 25 accelerates the automobile 10 at the predetermined acceleration α. The shift ECU 21 cancels the torque request value Treq if it is determined that the automatic transmission 25 is in such a condition that the automatic transmission 25 accelerates the automobile 10 at the predetermined acceleration α. Accordingly, whether the torque request value Treq for the engine 12 is abnormal or not can be more accurately determined, and acceleration of the automobile 10 which is not intended by the driver can be suppressed.

In the above embodiment, the shift ECU 21 determines if the torque difference ΔTup, which is the increased torque of the engine 12 obtained by subtracting the request torque T* requested for the engine 12 by the driver from the torque request value Treq, i.e., the torque of the engine 12 corresponding to the output command value from the shift ECU 21, is equal to or larger than the acceleration torque Ta required to accelerate the automobile 10 at the predetermined acceleration α that cannot be obtained when the torque request value Treq is set normally (step S160). If the torque difference ΔTup is equal to or larger than the acceleration torque Ta, the shift ECU 21 also determines if the input rotation acceleration dNi of the automatic transmission 25 (actual rotation acceleration of the input shaft 26) is less than the predicted rotation acceleration dNiprd that is obtained based on the engine torque Te output from the engine 12 minus the acceleration torque Ta (step S180). If the torque difference ΔTup is equal to or larger than the acceleration torque Ta and the input rotation acceleration dNi is less than the predicted rotation acceleration dNiprd, the shift ECU 21 informs the engine ECU 14 that the torque request value Treq should be cancelled, and prohibits the output command value setting module 210 from setting the torque request value Treq upon satisfaction of the output increase request conditions (step S210). Thus, regardless of whether the automatic transmission 25 is performing a shift operation or not, whether the torque request value Treq for the engine 12 is abnormal or not can be more accurately determined, and acceleration of the automobile 10 which is not intended by the driver can be suppressed.

Moreover, when the output increase request conditions are satisfied, the shift ECU 21 transmits the torque request value Treq, which represents the torque to be output from the engine 12, to the engine ECU 14 as a control device for the engine 12. Transmitting the torque request value Treq from the automatic transmission 25 side to the engine 12 side as necessary in this manner can improve traveling performance and drivability of the automobile 10. In this case, whether there is a possibility that the automobile 10 may be accelerated at the predetermined acceleration α without driver's intent can be more properly determined by comparing the torque difference ΔTup, which is obtained by subtracting the request torque T* by the driver from the torque request value Treq, with the acceleration torque Ta. The torque request value Treq may be set as a value representing torque (increase in torque) that is to be further output from the engine (motor) 12 in addition to the request torque T* by the driver.

The shift ECU 21 (output command value setting module 210) may be configured to transmit the target rotational speed Ne* of the engine 12 to the engine ECU 14 as a control device for the engine 12 when the output increase request conditions are satisfied. In this configuration, in order to determine if the target rotational speed Ne* of the engine 12 which is set by the output command value setting module 210 upon satisfaction of the output increase request conditions is abnormal, as shown in FIG. 5, input of the torque request value Treq is omitted when the data required for abnormality determination is input (step S105), and whether there is a possibility that the automobile 10 may be accelerated at the predetermined acceleration α without driver's intent or not is determined by comparing the torque difference ΔTup, which is obtained by subtracting the request value T* by the driver from the engine torque Te being output from the engine 12, with the acceleration torque Ta (step S155).

Moreover, in the above embodiment, the torque request value Treq has a maximum value in the case where a manual shift-down request by the driver corresponds to a predetermined shift-down pattern. The maximum value of the torque request value Treq is larger than the acceleration torque Ta that is required for the engine 12 in order that the automobile 10 is accelerated at the predetermined acceleration α in the state where the speed ratio that is set by the automatic transmission 25 is a predetermined speed ratio (e.g., a speed ratio corresponding to the first to third speeds). Setting the torque request value Treq in this manner can rapidly increase the rotational speed of the engine 12 or the input shaft 26 when a manual shift-down request is made by the driver, thereby drivability can be improved.

Although the present invention is described with respect to the case where the automatic transmission 25 is a stepped automatic transmission, the automatic transmission 25 may be configured as a belt type continuously variable transmission or other types of continuously variable transmissions.

Correspondence between the primary elements of the embodiment and the primary elements of the invention described in "SUMMARY OF THE INVENTION" will be described below. In the embodiment, the shift ECU 21, which controls the automatic transmission 25 mounted on the automobile 10 and capable of transmitting power applied from the engine 12 to the input shaft 26 to the output shaft 27 while changing the speed ratio and which sets the torque request value Treq or the target rotational speed Ne* for the engine 12 and transmits the torque request value Treq or the target rotational speed Ne* to the engine ECU 14 so as to increase output of the engine 12 when the predetermined output increase request conditions are satisfied, corresponds to the "control device for the automatic transmission." The shift ECU 21 that executes steps S130 to S200 of FIG. 4 or 5 corresponds to the "determining means." The torque determination module 221 that determines if the torque difference ΔTup, which is obtained by subtracting the request torque T* requested for the engine 12 by the driver from the torque request value Treq or the engine torque Te, is equal to or larger than the acceleration torque Ta required to accelerate the automobile 10 at the predetermined acceleration α, corresponds to the "torque determining means." The acceleration determination module 222 that determines if the input rotation acceleration dNi as the actual rotation acceleration of the input shaft 26 is less than the predicted rotation acceleration dNiprd of the input shaft 26 which is obtained based on the engine torque Te being output from the engine 12 minus the acceleration torque Ta corresponds to the "acceleration determining means." The correspondence between the primary elements of the embodiment and the primary elements of the invention described in "SUMMARY OF THE INVENTION" is shown by way of example to specifically describe the mode in which the embodiment carries out the invention described in "SUMMARY OF THE INVENTION." Thus, this correspondence is not intended to limit the elements of the invention described in "SUMMARY OF THE INVENTION." That is, the embodiment is merely a specific example of the invention described in "SUMMARY OF THE INVENTION," and the invention described in "SUMMARY OF THE INVENTION" should be construed based on the description therein.

Although the mode for carrying out the invention is described above based on the embodiment, it should be understood that the present invention is not limited in any way to the above embodiment, and various modifications can be made without departing from the spirit and scope of the present invention.

INDUSTRIAL APPLICABILITY

The present invention can be used in the field of manufacturing automatic transmissions.

The invention claimed is:

1. A control device for an automatic transmission which controls the automatic transmission mounted on a vehicle and capable of changing the speed of power from a motor to output the changed power, and which sets an output command value for the motor so as to increase output of the motor and transmits the output command value to a control device for the motor when predetermined output increase request conditions are satisfied, comprising:
determining means for determining if the automatic transmission is in such a condition that the automatic transmission accelerates the vehicle at predetermined acceleration when the output command value is transmitted to the control device for the motor, wherein
the output command value is not cancelled if it is determined by the determining means that the automatic transmission is not in such a condition that the automatic transmission accelerates the vehicle at the predetermined acceleration, and the output command value is cancelled if it is determined by the determining means that the automatic transmission is in such a condition that the automatic transmission accelerates the vehicle at the predetermined acceleration.

2. The control device for the automatic transmission according to claim 1, wherein
the determining means includes
torque determining means for determining if increased torque of the motor according to the output command value is equal to or larger than acceleration torque required to accelerate the vehicle at the predetermined acceleration, and
acceleration determining means for determining if the automatic transmission is in such a condition that the automatic transmission accelerates the vehicle at the predetermined acceleration, and
the output command value is not cancelled if it is determined by the torque determining means that the increased torque is less than the acceleration torque or if it is determined by the acceleration determining means that the automatic transmission is not in such a condition that the automatic transmission accelerates the vehicle at the predetermined acceleration, and the output command value is cancelled if it is determined by the torque determining means that the increased torque is equal to or larger than the acceleration torque or if it is determined by the acceleration determining means that the automatic transmission is in such a condition that the automatic transmission accelerates the vehicle at the predetermined acceleration.

3. The control device for the automatic transmission according to claim 2, wherein
the acceleration determining means determines that the automatic transmission is in such a condition that the automatic transmission accelerates the vehicle at the predetermined acceleration, if actual rotation acceleration of an input member of the automatic transmission is less than predicted rotation acceleration of the input member according to the output command value.

4. The control device for the automatic transmission according to claim 3, wherein
the acceleration determining means calculates the predicted rotation acceleration of the input member based on torque being output from the motor minus the acceleration torque.

5. The control device for the automatic transmission according to claim 2, wherein
the output command value is a torque request value representing torque to be output by the motor, and
the torque determining means sets as the increased torque the torque request value minus driver request torque that is requested for the motor by a driver.

6. The control device for the automatic transmission according to claim 5, wherein
the torque request value is larger than the acceleration torque when a manual shift-down request is made for the automatic transmission.

7. A control method for an automatic transmission, in which the automatic transmission mounted on a vehicle and capable of changing the speed of power from a motor to output the changed power is controlled, and an output command value for the motor is set so as to increase output of the motor when predetermined output increase request conditions are satisfied, and is transmitted to a control device for the motor, comprising the steps of:
(a) determining if the automatic transmission is in such a condition that the automatic transmission accelerates the vehicle at predetermined acceleration, when the output command value is transmitted to the control device for the motor; and
(b) not cancelling the output command value if it is determined in the step (a) that the automatic transmission is not in such a condition that the automatic transmission accelerates the vehicle at the predetermined acceleration, and cancelling the output command value if it is determined in the step (a) that the automatic transmission is in such a condition that the automatic transmission accelerates the vehicle at the predetermined acceleration.

\* \* \* \* \*